May 17, 1932.  J. H. HUNT  1,858,827
WIRE WHEEL HUB ASSEMBLY
Filed Feb. 6, 1929

Inventor
J. Harold Hunt
By Cromwell, Greist & Warden
Attys

Witness
R. B. Davison

Patented May 17, 1932

1,858,827

UNITED STATES PATENT OFFICE

J. HAROLD HUNT, OF LANSING, MICHIGAN, ASSIGNOR TO MOTOR WHEEL CORPORATION, OF LANSING, MICHIGAN, A CORPORATION OF MICHIGAN

WIRE WHEEL HUB ASSEMBLY

Application filed February 6, 1929. Serial No. 337,744.

This invention pertains to the assembly and mounting of wire wheels in the hub zone, and more particularly to the construction of the hub shell whereby to attain improved efficiency and appearance, a secure spoke anchorage and ease of mounting on the vehicle hub proper interchangeably with other types of wheels.

Figure 1:
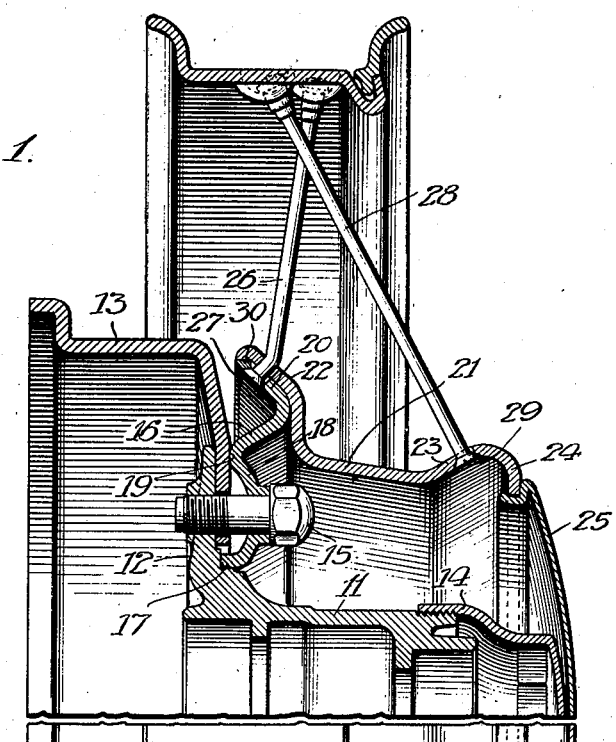
Figure 2:
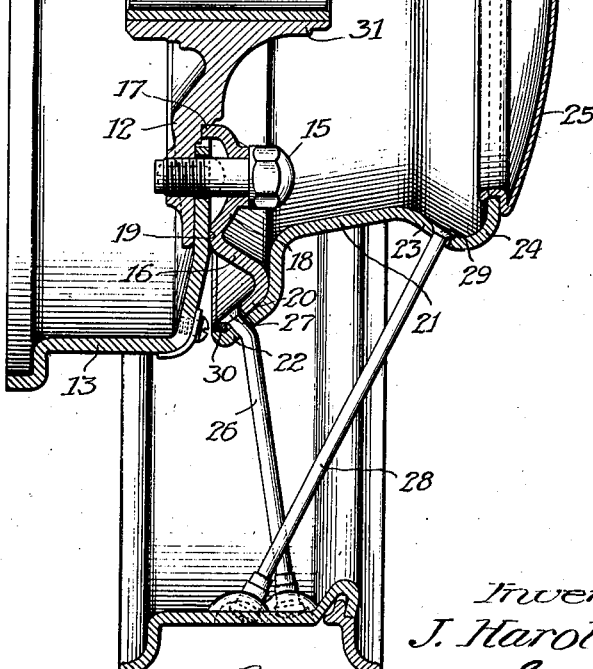

For the purpose of facilitating a ready understanding of the invention a preferred embodiment of the same is set forth in the accompanying illustrative drawings wherein Fig. 1 represents in radial section the assembly for a front wheel and Fig. 2 the assembly of the rear wheel.

Describing the structural features of the invention by reference to the appended drawings, the permanent hub of Fig. 1 comprises the barrel 11 and its radial flange 12, to the front face of which flange is secured the usual brake drum 13. Upon the front end of the hub barrel is secured the grease-retaining cap 14. The construction thus far referred to forms, of itself, no part of the present invention.

To the hub flange 12 is secured by means of the lug bolts 15 a disk-like annulus 16 which may well conform in contour to the inner zone of a disk wheel, which will provide for the ready substitution upon the hub of a standard disk wheel instead of the wire wheel assemblage here shown.

The annular plate or disk 16 has an easy fit at its inner edge 17 upon a radially facing shoulder of the hub barrel and that portion of the annulus apertured for the reception of the bolts 15 is arcuate in contour, whereby a tightening of the bolts 15 will tend to spread the arch 18 thereby to secure a tight fit upon said shoulder. It will be observed this annulus has a rear bearing intermediate its radial extent upon the hub flange or interposed drum at 19 and that the outer marginal portion 20 is flared or disposed at an oblique angle to the axis of the wheel.

The hub shell body includes a barrel 21 and a marginal portion 22 flared and adapted to lie parallel to and in contact with the marginal portion 20 of the annulus, while forwardly the shell is outwardly and then inwardly shaped to provide a diverging portion 23 and a converging marginal portion 24. The forward end of the barrel is open, said opening including the axes of the hub-attaching bolts 15 whereby to afford ready access to said bolts when the cover plate 25 is removed from the opening, wherein it is sprung or otherwise removably disposed to protect the interior of the shell from entrance of dirt and the like and also to conceal the bolts and hub from external view.

The marginal portion 20 of the annulus is apertured to receive the rear series of spokes 26 and countersunk to form a bearing for the spoke heads 27. The marginal portion 22 of the shell body is likewise apertured to permit a loose reception therein of the spokes 26. Similarly the flaring portion 23 of the shell body is apertured to receive the forward series of spokes 28 and countersunk to form a bearing for the spoke heads.

It will be observed that the driving torque of the rear series of spokes 26 is sustained, not by the hub shell, but by the annulus 16 which in turn transmits said torque directly to the hub proper; also that the aligning pull of the forward series of spokes 28 only is sustained by the hub shell; furthermore that the pull of the two series of spokes is in a direction to maintain the assembly relation between the annulus and the shell body rather than to separate the same, the annulus 16 being disposed within and interlocked with the rear end of the hub shell. This relationship is, of itself, sufficient to maintain the assemblage, but the marginal portions 20 and 22 of the annulus and shell are advantageously secured together by welding as indicated at 30.

The foregoing description applies in every particular to the rear wheel assemblage illustrated in Fig. 2, save as to the barrel portion of the hub proper, here represented by the reference numeral 31.

I claim:

1. A hub shell for demountable wire spoke wheels comprising a shaped generally cylindrical shell body open at the forward end, an annular disk-like member provided with hub-attaching apertures and secured within and closing the rear end of the shell, a forward series of wire spokes anchored in the forward end of the shell body, and a rear series of spokes transfixing the rear end of the shell body and anchored in the annulus, the axially projected area of the open end of the shell body including the hub-attaching apertures of the annulus.

2. A hub shell for demountable wire spoke wheels comprising a shaped generally cylindrical shell body open at the forward end, an annular disk-like member provided with hub-attaching apertures and secured within and closing the rear end of the shell, a forward series of rearwardly inclined wire spokes anchored in the forward end of the shell body, and a rear series of forwardly inclined spokes transfixing the rear end of the shell body and anchored in the annulus, the rear end of the shell body outwardly flared and the annulus having a correspondingly inclined marginal portion disposed parallel to and in contact with the flare of the shell body in the spoke-anchoring area.

3. A hub shell for demountable wire spoke wheels comprising a disk-like annular member adapted for seating on and securing to the permanent hub flange of a vehicle, and a second generally cylindrical member enveloping and extending forwardly from the first member and having an opening at its forward end, the area of which opening includes the points of attachment of the annular member to the hub, one group of wire spokes secured to each of said members and exerting tension in a direction to draw the members together.

4. A hub shell for demountable wire spoke wheels comprising a disk-like annular member adapted for seating on and securing to the permanent hub flange of a vehicle, and a second generally cylindrical hollow member extending forwardly from the first member and having an opening at its forward end, the area of which opening includes the points of attachment of the annular member to the hub, the rear margin of the cylindrical member outwardly flared and the margin of the annular member correspondingly inclined and lying within and in contact with the flaring margin of the cylindrical member, a forward group of wire spokes secured to the forward end of the cylindrical member, and a rear series of wire spokes secured to the inclined margin of the annulus and extending through the flared margin of the cylindrical member, whereby tension is exerted by the two series of spokes in directions tending to draw the members together.

5. The combination with the permanent hub barrel and flange of a vehicle wheel, of a hub shell for demountable wire wheels comprising a shaped generally cylindrical hollow shell body enveloping the hub barrel and open at the forward end, an annular member disposed within and closing the rear end of the shell about the hub barrel and against the hub flange, a forward series of wire spokes anchored in the forward end of the shell body, a rear series of spokes transfixing the rear end of the shell body and anchored in the annulus, and bolts attaching the annulus to the hub flange.

6. The combination with the permanent hub barrel and flange of a vehicle wheel, of a hub shell for demountable wire wheels comprising a shaped generally cylindrical shell body enveloping the barrel and open at the forward end, an annular member provided with bolt-receiving apertures and secured within the rear end of the shell about the hub barrel and against the hub flange, a forward series of wire spokes anchored in the forward end of the shell body substantially in the plane of the front end of the hub barrel, a rear series of spokes transfixing the rear end of the shell body and anchored in the annulus substantially in the plane of the bolt-receiving apertures, bolts seated in the apertures and attaching the annulus to the hub flange, the axially projected area of the open end of the shell body including the hub-attaching bolts, and a cover plate removably fitted to the open end of the shell normally to conceal but upon removal to give access to the attaching bolts.

In testimony whereof I have hereunto subscribed my name.

J. HAROLD HUNT.